United States Patent
Takahashi et al.

(10) Patent No.: US 6,279,491 B1
(45) Date of Patent: *Aug. 28, 2001

(54) METHOD OF TREATING EXHAUST GAS

(75) Inventors: Tomonori Takahashi, Chita (JP); Ralph T. Yang, Ann Arbor, MI (US)

(73) Assignee: NGK Insulators, Ltd., Nagoya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/412,961

(22) Filed: Oct. 5, 1999

(51) Int. Cl.$^7$ .................. F23B 7/00; B01D 53/02
(52) U.S. Cl. ............... 110/345; 110/342; 95/142
(58) Field of Search ................. 588/207, 209; 423/240 S, 245.3; 95/142, 901, 903; 110/342, 344, 345

(56) References Cited

U.S. PATENT DOCUMENTS

| | | |
|---|---|---|
| 4,740,488 * | 4/1988 | Fogler et al. ............ 502/84 |
| 5,113,772 | 5/1992 | Karasek'. |
| 5,254,797 * | 10/1993 | Imoto et al. ............ 588/207 |
| 5,451,388 * | 9/1995 | Chen et al. ............ 423/240 R |
| 5,514,356 * | 5/1996 | Lerner ............ 423/240 S |
| 5,591,417 * | 1/1997 | Buchanan et al. ............ 423/210 |
| 5,643,545 * | 7/1997 | Chen et al. ............ 423/245.3 |
| 5,653,949 * | 8/1997 | Chen et al. ............ 423/240 S |
| 5,895,636 * | 4/1999 | Nguyen et al. ............ 423/245.1 |

FOREIGN PATENT DOCUMENTS

| | | |
|---|---|---|
| 0 764 457 A2 | 3/1997 | (EP). |
| 4-87624 | 3/1992 | (JP). |
| 8-243341 | 9/1996 | (JP). |
| 9-29046 | 2/1997 | (JP). |
| 9-75667 | 3/1997 | (JP). |
| 9-75719 | 3/1997 | (JP). |
| 9-2678534 | 8/1997 | (JP). |
| 9-248425 | 9/1997 | (JP). |

* cited by examiner

Primary Examiner—Denise L. Ferensic
Assistant Examiner—K. B. Rinehart
(74) Attorney, Agent, or Firm—Burr & Brown

(57) ABSTRACT

A method of removing dioxins from an exhaust gas, including the steps of introducing gamma-alumina into a stream of the dioxin-containing exhaust gas, and sorbing dioxins on the gamma-alumina.

7 Claims, 4 Drawing Sheets

METHOD OF TREATING EXHAUST GAS

BACKGROUND OF THE INVENTION

The present invention relates to a method for treating an exhaust gas, in particular a dioxin-containing exhaust gas emitted from a waste incinerator.

FIG. 1 is a diagram illustrating a typical method for removing particulate matter (e.g., flyash) from exhaust gas produced by a waste incinerator. Burning waste (e.g., municipal waste) in an incinerator creates byproducts of (i) ash and (ii) exhaust gas and flyash, the former residing in the incinerator itself and the latter passing through the stack of the incinerator. It is standard operating procedure to flow the exhaust gas and flyash through a boiler to quench the exhaust gas and reduce the temperature thereof to a sufficiently low level so that a bag filter can be used to remove the flyash from the exhaust gas. The resultant exhaust gas is then passed through a scrubber and emitted to the environment through a stack.

It is well known that the incineration of municipal waste materials creates large volumes of organic compounds and hydrocarbons. These materials serve as precursors for various compounds, some of which are highly toxic. For example, aromatic compounds such as phenol or benzene, or chlorinated aromatic compounds such as chlorophenol or chlorobenzene, react in the presence of flyash to form dioxin, which is highly toxic.

It is believed that formation of dioxin in the presence of flyash is the result of a catalytic reaction wherein flyash is the catalyst. It is also believed that the catalytic reaction occurs when the temperature of the exhaust gas drops below 400° C., which typically occurs at a location between the boiler and the bag filter.

While it would seem logical to simply remove the flyash from the exhaust gas before the temperature of the exhaust gas drops below 400° C., and thus prevent the formation of dioxin in the first instance, there is no industrially practical method or apparatus for accomplishing such a goal. Accordingly, the industry has adopted various methods by which dioxin is removed from incinerator exhaust gas prior to being emitted to the environment through the stack of the incinerator.

The use of sorbent materials is the most common method for removing dioxin from incinerator exhaust gas. Sorbents are materials that adsorb or absorb dioxin or dioxin precursors, and examples of such sorbents include certain cements (JP 97-2678543), activated carbon and activated white clay (JP 92-87624 A and JP 96-243341 A), activated coke (JP 97-29046 A), silicates (JP 97-75719 A and JP 97-75667 A), and zeolites (JP 97-248425 A).

While it is most common to add such sorbents to the exhaust gas at an exhaust gas temperature of less than 400° C., to thereby sorb dioxin per se, another known method (EP 0 764 457) discloses adding sorbents to the exhaust gas at an exhaust temperature of greater than 400° C. to remove dioxin precursors from the exhaust gas.

While all of the above-described methods are effective to remove dioxin from the exhaust gas to some degree, there are problems associated with each method. The main problem with using carbon-based sorbents is that there is a distinct possibility that the carbon will oxidize in the exhaust stream and cause a fire in the bag filter, for example. In addition to the obvious danger associated with such a fire, the heat generated as a result of the fire would cause all of the dioxin or dioxin precursors sorbed on the activated carbon to desorb and thus be emitted out of the incinerator stack.

The problem with using other sorbents such as silicates and zeolites, for example, is that the desorption temperature of those materials is too close to the vaporization temperature of dioxin itself. Specifically, the vaporization temperature of dioxin is about 220° C., whereas the temperature at which dioxin desorbs from materials such as silicates and zeolites ranges from about 220° C. to 260° C. Sorption of dioxin is most effective when the dioxin is in a gaseous state, and the sorption efficiency of a sorbent depends largely upon how close the dioxin desorption temperature of the material is to the vaporization temperature of dioxin. Accordingly, the sorption efficiency of materials such as silicates and zeolites is relatively poor, because the desorption temperature of those materials is too close to the vaporization temperature of dioxin.

One reason that activated carbon is effective as a dioxin sorbent is that its desorption temperature is not close to the vaporization temperature of dioxin. The problem of combustion in the bag filter, however, is still a significant concern.

It would be desirable to provide a method for removing dioxin from incinerator exhaust gases without the threat of fire (associated with the use of activated carbon) and without the problem of sorption inefficiency (associated with materials such as silicates and zeolites). To date, however, the industry has not provided any such method.

SUMMARY OF THE INVENTION

It is an object of the present invention to provide a method for removing dioxin from an exhaust gas that overcomes the above-discussed problems associated with the prior art methods.

In accordance with one embodiment of the present invention, gamma-alumina is used as a sorbent to remove dioxin from an exhaust gas.

In accordance with another embodiment of the present invention, a method of removing dioxin from an exhaust gas includes the steps of introducing gamma-alumina into a stream of the dioxin-containing exhaust gas, and sorbing dioxin on the gamma-alumina. When used in particulate form, gamma alumina is introduced into the exhaust stream. Its method of operation is the same as activated carbon and granulation is helpful to the sorption process.

The inventors discovered that gamma-alumina sorbs dioxin like activated carbon, and, thus, can be used effectively as a sorbent of dioxin contained in an exhaust gas. Gamma-alumina has a dioxin desorption temperature of about 300° C., which is substantially higher than the vaporization temperature of dioxin (220° C.), and, thus, exhibits high dioxin sorptivity at temperatures not greater than 300° C. Additionally, gamma-alumina does not oxidize easily in the exhaust gas stream, and thus does not pose a significant threat of fire in the exhaust gas stream.

The gamma-alumina can be introduced into the exhaust gas stream as a sorption bed, such as a layer supported on a honeycomb structure substrate, or in particulate form. In the former case, the gamma-alumina can be introduced either upstream or downstream of the bag filter, provided the temperature of the exhaust gas upstream of the bag filter does not substantially exceed 300° C. In the latter case, the particulate gamma-alumina should be added upstream of the bag filter to allow collection of the gamma-alumina in the bag filter. The temperature of the exhaust gas upstream of the bag filter is not so critical in this case, as the particulate gamma-alumina continues to sorb dioxin as it flows downstream with the exhaust gas into the bag filter (where the temperature is certainly less than 300° C.). While it is possible to introduce the particulate gamma-alumina into the exhaust gas downstream of the bag filter, a second filter would be required to collect the particulate material.

BRIEF DESCRIPTION OF THE DRAWINGS

For a fuller understanding of the nature and objects of the invention, reference should be made to the following detailed description of a preferred mode of practicing the invention, read in connection with the accompanying drawings, in which.

DETAILED DESCRIPTION OF THE INVENTION

Figure 1:
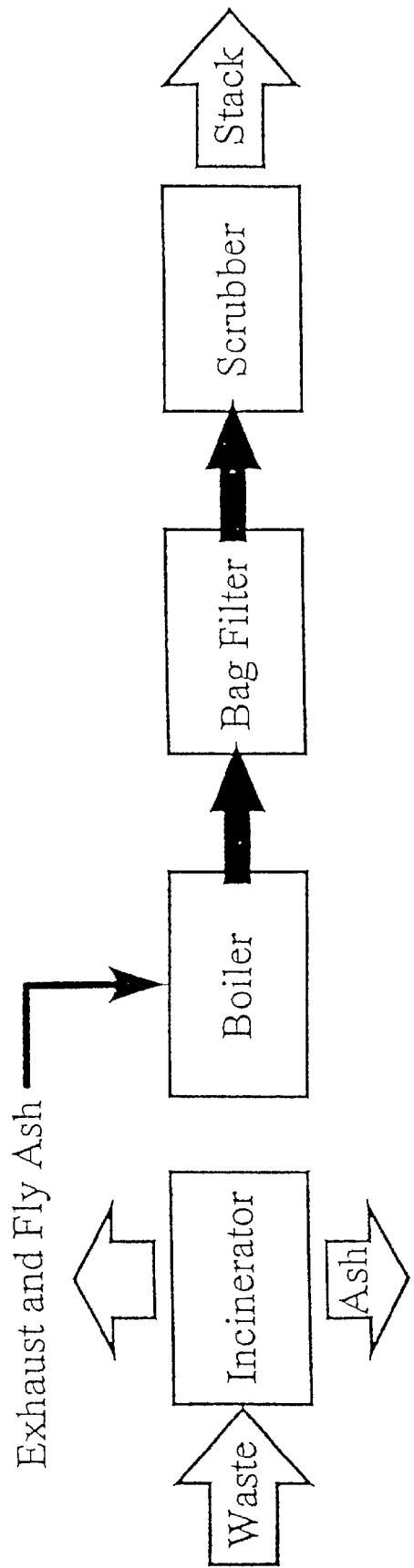
FIG. 1 is a diagram illustrating a conventional waste incinerator system.
Figure 2:
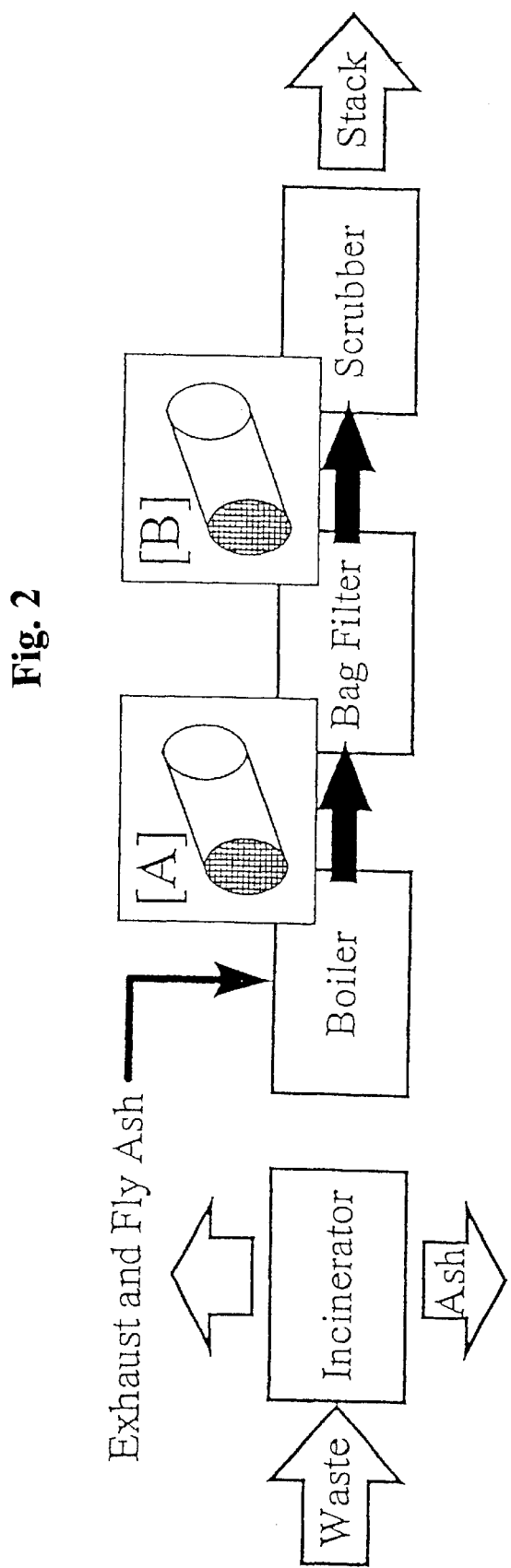
FIG. 2 is a diagram illustrating a waste incinerator system, wherein an integral body of gamma-alumina is introduced into the exhaust gas stream at position A or B.

FIG. 2 is identical to the diagram shown in FIG. 1, but also includes boxes A and B to show the location of where a sorption bed of gamma-alumina would be introduced into the exhaust gas stream. The sorption bed of gamma-alumina could be introduced upstream or downstream of the bag filter, depending upon the temperature of the exhaust gas at those two locations. The preferred exhaust gas temperature range within which the exhaust gas should contact the sorption bed of gamma-alumina ranges from greater than 100° C. to no greater than 300° C., preferably greater than 220° C. to no greater than 300° C. If the sorption bed of gamma-alumina is contacted with the exhaust gas at a temperature of less than 100 ° C., water vapor in the exhaust gas significantly deteriorates the sorption efficiency of the gamma-alumina. On the other hand, if the sorption bed of gamma-alumina is contacted with the exhaust gas at a temperature greater than 300° C., the gamma-alumina is substantially incapable of sorbing dioxin contained in the exhaust gas.

While the sorption bed of gamma-alumina can take any form, it is preferred to be introduced into the exhaust gas stream in the form of porous pellets or a high surface area honeycomb structure, such as those structures typically used in treating automobile exhaust gas. In both cases, a gamma-alumina slurry is prepared, applied to the porous pellets or substrate as a washcoat, and, then dried to form a solid layer.

When using a honeycomb structure as the underlying substrate, it is most preferred that the honeycomb structure be formed of a low thermal expansion coefficient ceramic material, such as cordierite or an equivalent material, with a layer of gamma-alumina formed on the exposed surfaces of the underlying ceramic substrate.

While the thickness of the gamma-alumina layer formed on the substrate is not critical it should range from 10 μm to 1 mm, preferably 100 μm to 500 μm. While the dimensions of the honeycomb body will vary depending upon application, the active surface area of the gamma-alumina should be at least 3 m² per unit volume (NM³) of exhaust gas to be treated.

After the dioxin has been sorbed by the gamma-alumina carried on the honeycomb substrate, the substrate is heated to a temperature exceeding 500° C. to desorb the dioxin from the gamma-alumina and thermally decompose the dioxin into non-toxic byproducts, which can then be emitted into the environment through the incinerator stack.

Figure 3:
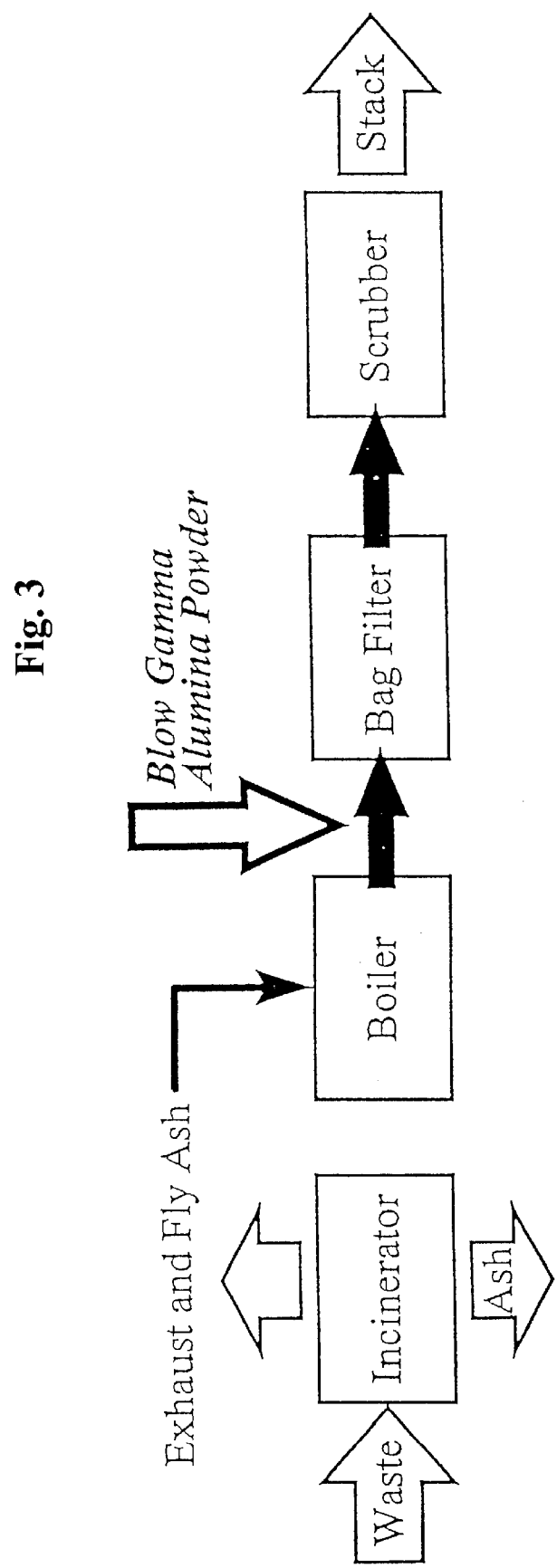
FIG. 3 is a diagram illustrating a waste incinerator system, wherein particulate gamma-alumina is introduced into the exhaust gas stream upstream of the bag filter.

FIG. 3 is also identical to FIG. 1, but shows the location where gamma-alumina in particulate form would be introduced into the exhaust gas stream, in the same manner as activated carbon in the prior art. It is preferable to granulate the gamma-alumina to improve handling and the flow properties of the powder. It is also preferable to introduce the gamma-alumina at this location so as to make use of the collection function of the bag filter that is typically standard equipment in municipal incinerator systems. It is possible to introduce the particulate gamma-alumina downstream of the bag filter, but such an operation would require a secondary filter to collect the particulate gamma-alumina.

While any type of particulate gamma-alumina could be used, it is preferred that the particles have an average particle diameter ($\phi_{ave}$) ranging from 1 to 100 μm.

The volume of particulate gamma-alumina introduced into the exhaust gas stream will depend upon the volume of exhaust gas to be treated. Generally speaking, a sufficient amount of particulate gamma-alumina should be added to provide 3 m² surface area of gamma-alumina for every 1 Nm³ of exhaust gas to be treated.

Once the dioxin is sorbed on the particulate gamma-alumina, that material is collected in the bag filter along with the flyash, and disposed of in a manner well known in the art.

It is also possible to introduce hydroxides, precursors of gamma-alumina, into the exhaust gas stream to sorb dioxin. Such hydroxides are heated in the exhaust gas stream, dehydrated and converted to gamma-alumina, which in turn sorbs dioxins in the gas stream.

EXAMPLE

The following example is provided to illustrate the inventive concepts of the present invention, and is not intended to in any way limit the present invention in scope or spirit.

Figure 4:
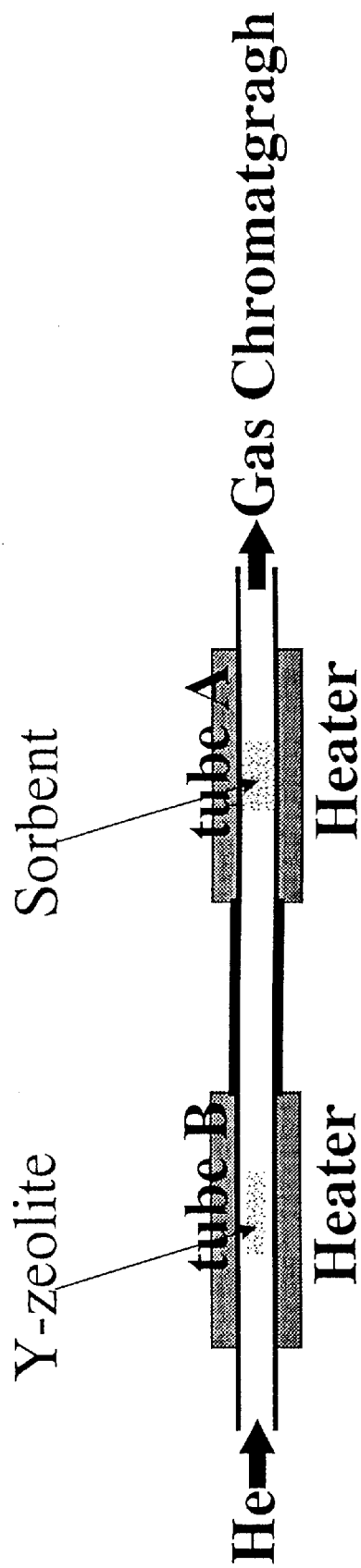
FIG. 4 is a diagram illustrating a test apparatus used for demonstrating the efficacy of the present invention.

A test apparatus as shown in FIG. 4 was constructed. The apparatus included a 22 mm diameter tube designed to hold powder materials in the regions marked "tube A" and "tube B". Each of these regions was also exposed to a dedicated heat source to control the temperature of the respective region.

Y-zeolite powder was added to tube B and held there in the form of a sorption bed. A solution containing 0.01 mL of DMF (Dimethyleformamid) of dibenzo-p-dioxin (50 mg/mL) was doped into tube B. Various other materials were held in tube A each also in the form of a sorption bed. Each material was added to tube A in an amount of 50 grams. A supply of He was connected to the upstream side of tube B and a gas chromatograph (GC.) was connected to the downstream side of tube A to detect the presence of dioxin in the gas stream passing through tube A.

Tube A was heated to 275° C., 300° C. and 325° C., He was supplied to the tube at 500 mL/min, and tube B was heated to 275° C. (to desorb the dioxin from the Y-zeolite). These steps were repeated for each material added to tube B. The detection of dioxin by the GC is shown in the following Table:

| Sorbent in tube A | 275° C. | 300° C. | 325° C. |
|---|---|---|---|
| activated carbon | none | none | none |
| gamma alumina | none | none | none |
| bentonite | none | detected | detected |
| Y-zeolite | detected | detected | detected |
| laponite | detected | detected | detected |
| clinoptilolite | detected | detected | detected |

This experiment confirmed that gamma-alumina is as effective as activated carbon in sorbing dioxin, but without the inherent drawbacks associated with activated carbon.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method of removing dioxins from an exhaust gas, comprising the steps of:

passing a stream of dioxin-containing exhaust gas through a filter to remove particulate matter therefrom;

introducing gamma-alumina into the stream of dioxin-containing exhaust gas at a position downstream of the filter; and sorbing dioxins on or in the gamma-alumina.

2. A method of removing dioxins from an exhaust gas, comprising the steps of:

introducing gamma-alumina into a stream of the dioxin-containing exhaust gas at an exhaust gas temperature of 220° C.–300° C.;

sorbing dioxins on or in the gamma-alumina; and heat-treating the gamma-alumina to dispose of the sorbed dioxins.

3. The method of claim 2, wherein said gamma-alumina is supported on a high surface area substrate.

4. The method of claim 3, wherein said high surface area substrate comprises a ceramic honeycomb body.

5. The method of claim 2, further comprising the step of passing the stream of dioxin-containing exhaust gas through a filter to remove particulate matter therefrom, and said gamma-alumina is introduced into the stream of dioxin-containing exhaust gas at a position upstream of the filter.

6. The method of claim 5, wherein said gamma-alumina is introduced into the stream of dioxin-containing exhaust gas in particulate form.

7. The method of claim 2, wherein said heat-treating step is performed at a temperature exceeding 500° C. to desorb the dioxin from the gamma-alumina and thermally decompose the dioxin into non-toxic byproducts.

* * * * *